United States Patent Office.

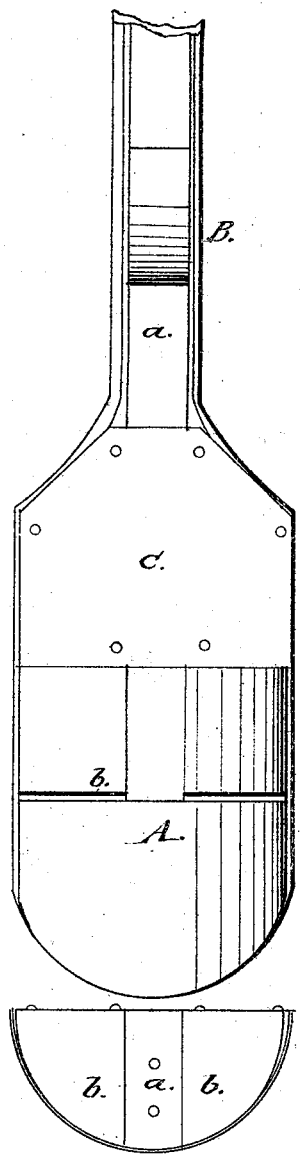

ANDREW NONNAMAKER, OF CIRCLEVILLE, OHIO.

Letters Patent No. 93,736, dated August 17, 1869.

IMPROVEMENT IN SCOOPS.

The Schedule referred to in these Letters Patent and making part of the same.

*To all whom it may concern:*

Be it known that I, ANDREW NONNAMAKER, of Circleville, in the State of Ohio, have invented a new and useful Improvement in Lard-Scoops; and I do hereby declare that the following is a full, clear, and exact description of the same, reference being had to the accompanying drawings, and letters of reference marked thereon, making a part of this specification, in which—

Figure 1 is a plan view, and
Figure 2, a front elevation.

This invention consists in arranging a slide, so as to play longitudinally, of an ordinary scoop, for the purpose of thoroughly removing from the same, its contents when they consist of lard or other such cohesive matter, that does not readily remove itself.

To enable those skilled in the art to make and use my invention, I now proceed to describe its construction and operation.

Similar letters in the drawings refer to like parts.
In the drawing—

A represents a metallic scoop, affixed to the end of a wooden handle, B.

The upper surface of the end of the handle is made flat, and a groove runs longitudinally of the flattened part.

In the groove is placed the haft $a$ of a slide, $b$.

The slide is placed transversely of the scoop and curved around its edge, so as to fit the scoop closely.

The haft $a$ is sufficiently long to enable the operator to draw the slide over every part of the scoop, and thus clear it of its contents whenever they are of a kind that sticks to the scoop, such as lard, butter, &c.

A piece of sheet-metal, $c$, is attached to the upper flat surface of the end of the handle, and serves to hold the haft in its place.

The scoop thus improved must be acknowledged to be an exceedingly useful implement. It is, at the same time, very cheaply manufactured.

What I claim as new, and desire to secure by Letters Patent, is—

A scoop, provided with a slide, for clearing it of its contents, substantially as described.

ANDREW NONNAMAKER.

Witnesses:
J. A. LUTZ,
W. BROOMHALL.